(12) United States Patent
Eilert et al.

(10) Patent No.: US 7,378,119 B2
(45) Date of Patent: May 27, 2008

(54) MEAT ENHANCEMENT SYSTEM

(75) Inventors: Scott J. Eilert, Wichita, KS (US);
Curtis A. Cundith, Wichita, KS (US);
Max England, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 186 days.

(21) Appl. No.: 10/232,847

(22) Filed: Aug. 30, 2002

(65) Prior Publication Data

US 2004/0043118 A1 Mar. 4, 2004

(51) Int. Cl.
*A23L 1/314* (2006.01)
(52) U.S. Cl. ............ 426/281; 426/332; 426/641; 426/646
(58) Field of Classification Search ............ 426/281, 426/332, 641, 646
See application file for complete search history.

(56) References Cited

U.S. PATENT DOCUMENTS

| 4,442,868 A | 4/1984 | Smith |
| 6,020,012 A | 2/2000 | Kauffman |
| 6,869,632 B2 * | 3/2005 | Kauffman et al. ........... 426/281 |
| 2003/0175391 A1 | 9/2003 | Kauffman |
| 2004/0043118 A1 | 3/2004 | Eilert |

FOREIGN PATENT DOCUMENTS

| DE | 3212732 | | 10/1983 |
| DE | 19748598 A1 | | 6/1999 |
| EP | 0209268 | * | 1/1987 |
| JP | 55-54854 | | 4/1980 |
| JP | 55054854 | | 4/1980 |
| JP | 63042667 | | 2/1988 |
| JP | 2001224336 | | 8/2001 |
| SU | 1053805 | | 11/1983 |
| SU | 1606082 | | 11/1990 |
| WO | WO 97/46119 | | 12/1997 |

OTHER PUBLICATIONS

Kauffman et al, "Can Pale, Soft, Exudative Pork Be Prevented By Postmortem Sodium Bicarbonate Injection?", J. Anim. Sci. 1998, 76: 3010-3015.*
Wederquist, H.J., et al., "Culture Media Comparison for the Enumeration of *Listeria monocytogenes* in Refrigerated Vacuum Packaged Turkey Bologna Made with Chemical Additives", Lebensm.-Wiss u.-Technol. 28,455-461 (1995).
Wederquist, H.J., et al., "*Listeria monocytogens* Inhibition in Refrigerated Vacuum Packaged Turkey Bologna by Chemical Additives", Journal of Food Science, vol. 59, No. 3, 598-500 (1994).
Bonifer, L.J., et al., "Textural, Color, and Sensory Properties of Bologna Containing Various Levels of Washed Chicken Skin[1]", Poultry Science Association, Inc. 1047-1055 (1996).
Ragaee, S.M., et al., "Formulating and Sensory Evaluation of Some Products of Fermented Lentils", Alex.Sci.Exch., vol. 7, No. 1, 111-120 (1986).
Bechtel, Peter J., et al., "Properties of Frankfurters Processed with Potassium and Sodium Bicarbonate", Journal of Food Quality, vol. 11, No. 1, 475-485 (1988).
Ravishankar, C.N., Method for the preparation of sausages of acceptable quality from Indian oil sardine (*Sardinella longiceps*) and their shelf-life at different storage temperatures, Food Control, vol. 3, No. 3, 144-148 (1992).
Sofos, J.N., et al., "Potential for growth and inhibition of *Listeria monocytogenes* in meat and poultry products", Food Flavors: Generation, Analysis and Process Influence, (Proceedings of the 8th International Flavor Conference, COS, Greece, Jul. 6-8, 1994) Elsevier 1243-1264 (1995).
Klettner, Paul-Gerhard, "Frankfurter-type sausage, Influence of heat treatment on firmness and colour", Fleischwirtsch. 73 (3), 296-298 (1993).
Eerola, Susana, et al., "Liquid Chromatographic Determination of Biogenic Amines in Dry Sausages", Journal of AOAC International, vol. 76, No. 3, pp. 575-577 (1993).
San-Bok, Suh, et al., "Processing, Quality Stability and Utilization of Approved Sardine Surimi for Surimi-based Products", J. Korean Soc. Food Sci. Nutr. 28(2), pp. 403-408 (1999).
Ravishankar, C.N., et al., "Studies on the Utilization of Indian Oil Sardine (*Sardinella longiceps*) for the Preparation of Fish Sausage: 2. Effect of Sodium Bicarbonate Treatment on Meat Characteristics and Sausage Quality", Fishery Technology, vol. 30, No. 1, pp. 52-56, Jan. 1993.
Mayberry, Steve, "Challenge for Pork Industry Goes Beyond Lean Hog", Feedstuffs, v72, n23, 4pgs (Jun. 5, 2000).
"2002 Swine Research Review", National Hog Farmer, v47, n12, 17pgs (Dec. 15, 2002).
"Research Leads to Higher Quality Pork", Engineering & Technology for Sustainable World, vol. 9, Issue 12, 2pgs, (Dec. 1, 2002).

* cited by examiner

*Primary Examiner*—Arthur L Corbin (57) ABSTRACT

The present invention is an enhanced fresh meat composition and method of making the same. The fresh processed meat composition is made from post-rigor meat and includes a bicarbonate additive.

16 Claims, 4 Drawing Sheets

MEAT ENHANCEMENT SYSTEM

BACKGROUND OF THE INVENTION

1. Technical Field

The present invention relates to improved enhanced fresh meat products and methods of making the enhanced fresh processed meat products. More specifically, it relates to processed and injected fresh meat products made from post-rigor meat with the addition of a bicarbonate.

2. Background

Meat is a highly perishable food product that becomes unfit for consumption as a result of microbial growth, chemical change, or breakdown by endogenous enzymes. Enhanced meat products include processed meat products and meat products having an added brine or flavoring. One method for extending the shelf life of enhanced fresh meat products is the addition of chemicals during processing. These chemical additives can slow the microbial growth and chemical changes.

Typically, meat used in enhanced fresh meat products is processed before the onset of rigor mortis Rigor mortis ("rigor") is the stiffening and loss of extensibility of the muscles that occurs in animals soon after death. Processing meat prior to the onset of rigor ("pre-rigor processing") is commonly believed to provide superior color appearance, color stability, and shelf life. The disadvantages associated with pre-rigor processing include the time constraints of processing all meats prior to the onset of rigor, which typically occurs about twenty-four hours post-mortem. As a result of these time constraints, a substantial portion of meat is often unavailable for pre-rigor processing.

There is a need in the art for enhanced meat products made from post-rigor meat and methods of making these enhanced meat products.

BRIEF SUMMARY OF THE INVENTION

The present invention, in one embodiment, is an enhanced fresh meat composition. The composition includes fresh post-rigor meat and bicarbonate. The bicarbonate is present from about 0.05% to about 0.5% of the processed fresh meat composition. In one embodiment, the bicarbonate is sodium bicarbonate and is present in an amount of about 0.125% by weight. In other embodiments, other ingredients are added, such as lactates, water, and seasoning.

Another embodiment of the present invention is a method of making a processed meat composition. The method includes providing fresh post-rigor meat and adding bicarbonate in an amount from about 0.05% to about 0.5% of the processed meat composition.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The present invention involves enhanced fresh meat products and methods of making the enhanced meat products using post-rigor meat. To use post-rigor meat in enhanced fresh meat products, bicarbonate can be added to the meat. The addition of bicarbonate to post-rigor meat provides improved color, improved stability, and increased shelf life of the treated meat product in comparison to untreated meat. Enhanced meat products include meat products having flavoring or brine added and processed meat products.

One type of processed fresh meat product is ground meat products. Preparation of ground meat products can involve several steps. For example, the meat can be ground with a coarse grinder. The coarse grinder grinds meat into pieces ranging in diameter from about ⅜ inch to about 1 inch. In one embodiment of the present invention, the coarse grinder is a ⅜ inch grinder. Next, a blending step can involve blending seasoning and other additives into the meat. In one embodiment of the invention, no seasoning is added to the meat. After blending, there can be a second grinding step with a fine grinder. The fine grinder grinds meat into pieces ranging in diameter from about ⅛ inch to about ¼ inch. In one embodiment, the fine grinder is a 3/16 inch grinder. Generally, the processed meat can be maintained as ground meat, stuffed into a natural casing, or shaped into a patty or any other form known in the art. The preparation of such processed meat involves the use of fresh meat. In one aspect of the invention, the preparation can also involve meat that is intended to be frozen at a later time.

The present invention involves the addition of bicarbonate to post-rigor meat during the preparation of fresh processed meat products. In the embodiments disclose, the fresh process meat composition includes from about 87.0% to about 99.95% of post-rigor meat by weight. Post-rigor meat having any acceptable fat content can be used with the present invention. In one embodiment, the fat content of the meat is from about 10.0% to about 50.0% fat. The meat can be any meat, including pork, turkey, beef, or some other meat. The post-rigor cuts of pork, for example, include shoulder, picnic, belly, ham, loin, or pork trimmings intended for use in fresh sausage. Pork trimmings are smaller pieces of muscle and fat that are not used in other cuts. In one aspect of the present invention, the meat is 72% lean pork picnic shoulder, which comes from the lower part of the pig's shoulder.

"Bicarbonate" is intended to include both metallic and nonmetallic salts such as, for example, sodium, potassium, magnesium, and quaternary ammonium salts. In one embodiment, the bicarbonate makes up from about 0.05% to about 0.5% of the fresh processed meat composition by weight. In another embodiment, the bicarbonate makes up from about 0.075% to about 0.2% of the composition by weight. In another embodiment, the bicarbonate makes up about 0.125% of the composition by weight. The additive can be incorporated into the post-rigor meat in a variety of forms. In one embodiment, the bicarbonate is added to the meat in granular or powder form. Alternatively, the bicarbonate is first dissolved in water or is added as part of a solution of water and lactate. Other forms of the additive also fall within the scope of the present invention.

Bicarbonate can be added at various stages of processing the post-rigor meat. In one embodiment, bicarbonate is added during the blending step as described for the meat preparation above. Alternatively, bicarbonate can be injected into the meat prior to the first grinding step, or applied to the surface of the meat after the first grinding step.

The elapsed time after the onset of rigor for addition of the bicarbonate can vary. According to one embodiment of the present invention, the bicarbonate is added about 24 hours after the onset of rigor. Alternatively, the chemical can be added at a later time, up to and beyond about 72 hours post-rigor. In another embodiment, the bicarbonate is added after an elapsed time period of less than 24 hours from the onset of rigor. In all cases, the bicarbonate is added after the onset of rigor.

Other ingredients can be added during the processing of the meat. In some embodiments, seasonings are added to the post-rigor meat. Seasonings include any ingredients typically added to fresh processed meat products for taste. For example, the seasonings can include any bratwurst seasoning used in the art. The seasonings can make up from about 0.0% to about 5.0% of the fresh processed meat composition by weight or from about 3.0% to about 5.0% of the composition by weight.

In other embodiments, water is added to the post-rigor meat. The water can make up from about 0.0% to about 3.0% of the fresh processed meat composition by weight. In further embodiments, a lactate can be added to the post-rigor meat. For example, the lactate can be potassium lactate or sodium lactate. The lactate can make up from about 0.0% to about 4.0% of the fresh processed meat composition by weight, or from about 2.0% to about 4.0% of the composition by weight.

The following examples are presented by way of demonstration, and not limitation, of the invention.

EXAMPLE 1

One embodiment of the composition of the present invention was compared to a control composition lacking bicarbonate to examine the differences in overall color quality, color stability and shelf life.

The composition of the present invention included the following components to make 100 lbs of the invention:

| Wt. (lbs) | Component |
| --- | --- |
| 89.97 | 72% Lean Pork Picnic Shoulder |
| 3.1 | Potassium Lactate |
| 1.8 | Water |
| 0.125 | Sodium Bicarbonate |
| 5.0 | Seasoning |

The pork picnic shoulder was first ground in a 3/8 inch grinder. To the ground meat was added potassium lactate, water, sodium bicarbonate dissolved in water, seasoning, and dry ice. Subsequently, the composition was ground a second time in a 3/16 inch grinder. After the second grinding step, the meat was stuffed into natural casing to form the typical sausage shape and packaged in trays.

A control composition without the sodium bicarbonate additive was produced with the following components to make 100 lbs of fresh sausage:

| Wt. (lbs) | Component |
| --- | --- |
| 89.97 | 72% Lean Pork Picnic Shoulder |
| 3.1 | Potassium Lactate |
| 1.925 | Water |
| 5.0 | Seasoning |

For the control sausage, the pork picnic shoulder was first ground in a 3/8 inch coarse grinder. To the ground meat was added potassium lactate, water, seasoning, and dry ice. Subsequently, the composition was ground a second time in a 3/16 inch fine grinder After the second grinding step, the meat was stuffed into natural casing to form the typical sausage shape and packaged in trays.

Testing

The impact of a sodium bicarbonate additive was tested in light of two different variables: packaging and time of storage prior to retail display. The first variable involved packaging the control and test sausages in two different ways: (1) tray overwrap packaging and (2) lidstock packaging. Sausages in tray overwrap packaging were placed in a foam container and covered by a plastic overwrap that was wrapped over the container. Lidstock packaging consisted of packaging the sausages in a hard plastic container with a plastic sheet heat-sealed over the container opening.

For the second variable, control and test sausages were stored for either 10 days or 17 days before being placed in a display case. The 10-day storage test included 10 additional days in the display case for a total of 20 days. The 17-day storage test included five additional days in the display case for a total of 22 days.

Results

In the 10-day storage test, the treated sausage had a better overall color and less discoloration than the untreated sausage regardless of the type of packaging.

Figure 1:
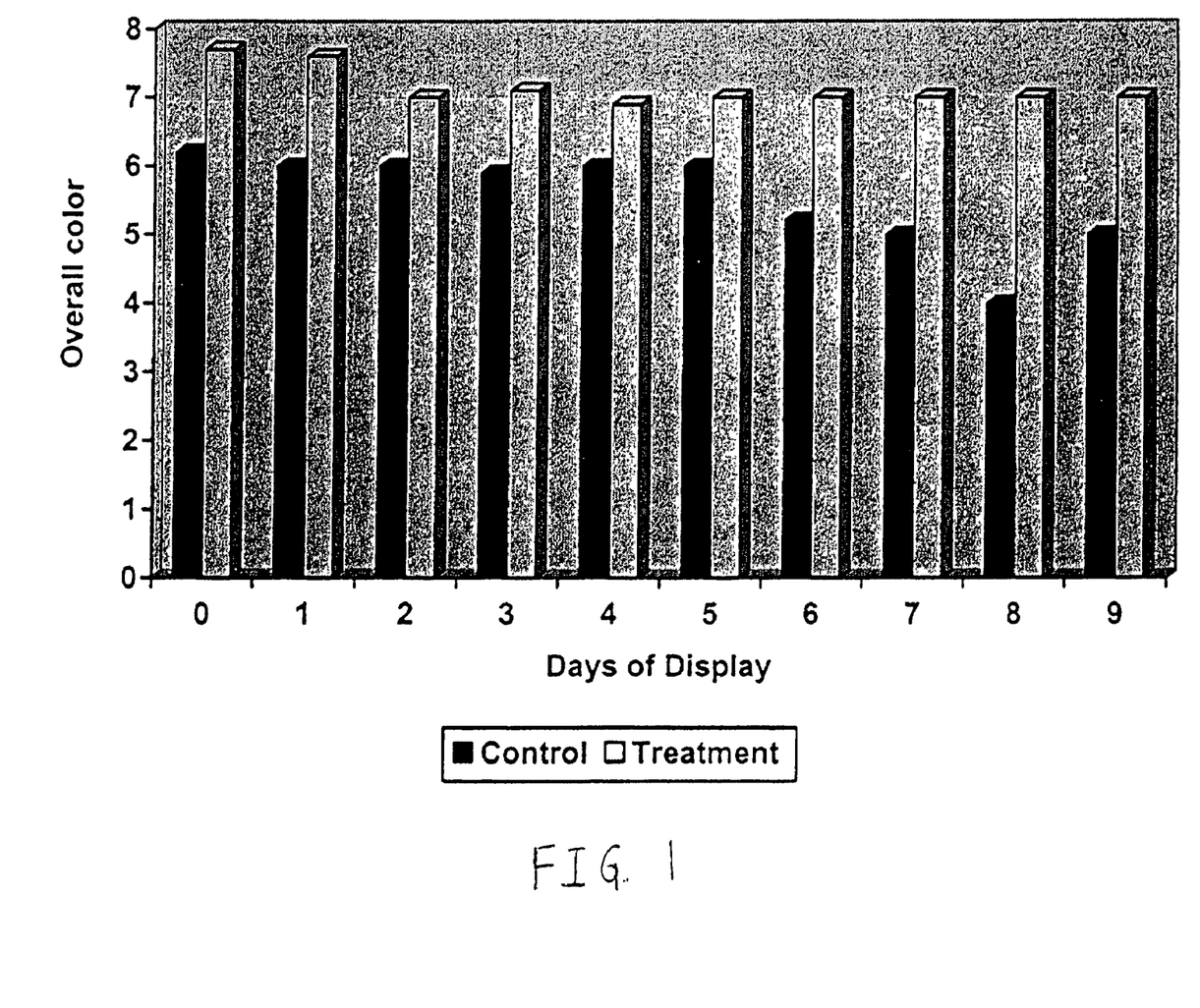
FIG. 1 is a bar graph depicting the overall color quality of sausage packaged in overwrap packaging after ten days of storage, according to one embodiment of the present invention.
Figure 2:
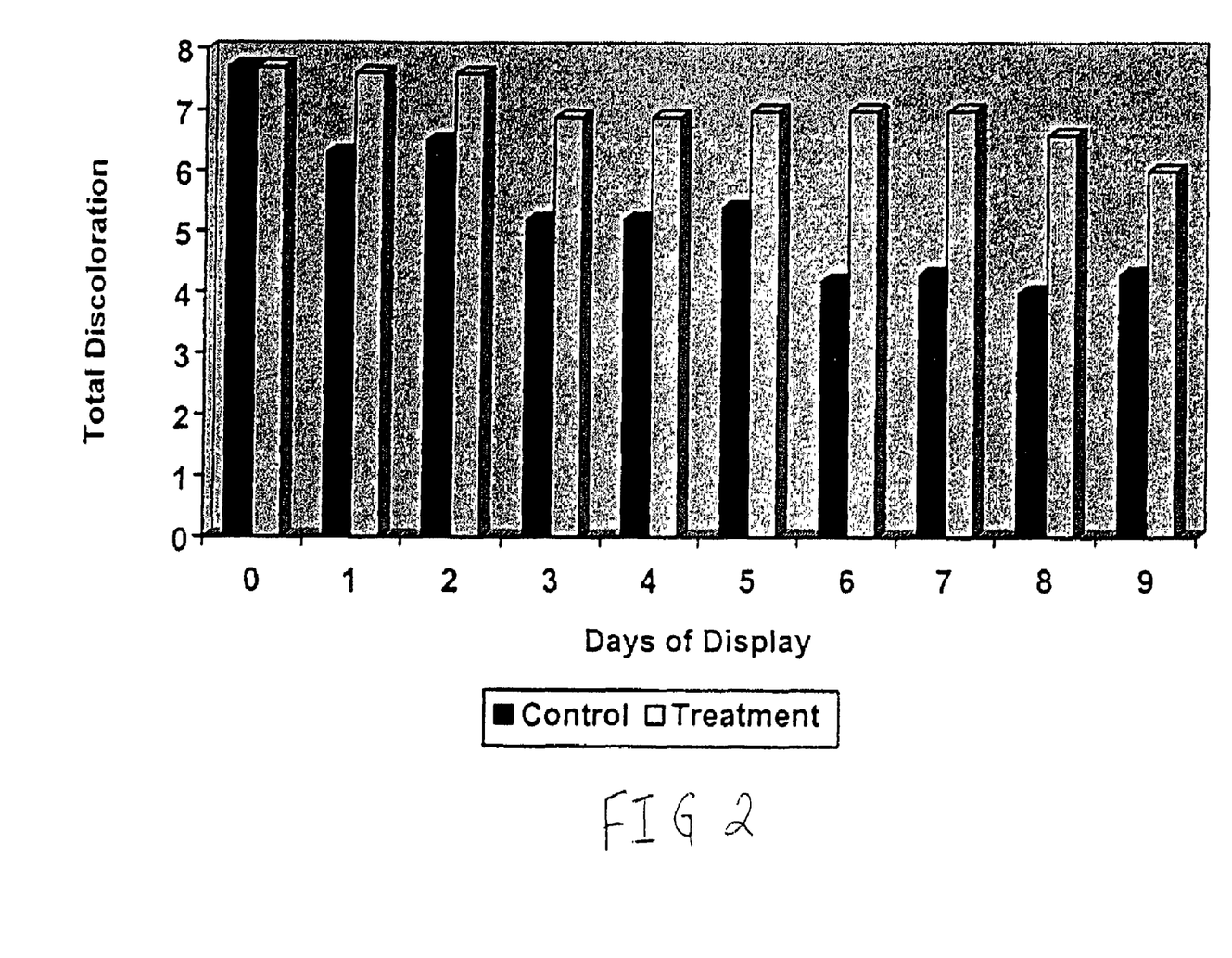
FIG. 2 depicts the color stability of sausage packaged in overwrap packaging after ten days of storage, according to one embodiment of the present invention.

The results related to the overwrap packaging showed that the treated sausage was superior to the untreated sausage. As shown in the charts shown in FIG. 1 and FIG. 2, the superiority of treated sausage for overall color and color stability lasted for the length of the 10 days in the display case. Both charts are based on an 8 point scale in which 1 is extremely undesirable color or total discoloration and 8 is extremely desirable color or no discoloration.

Figure 3:
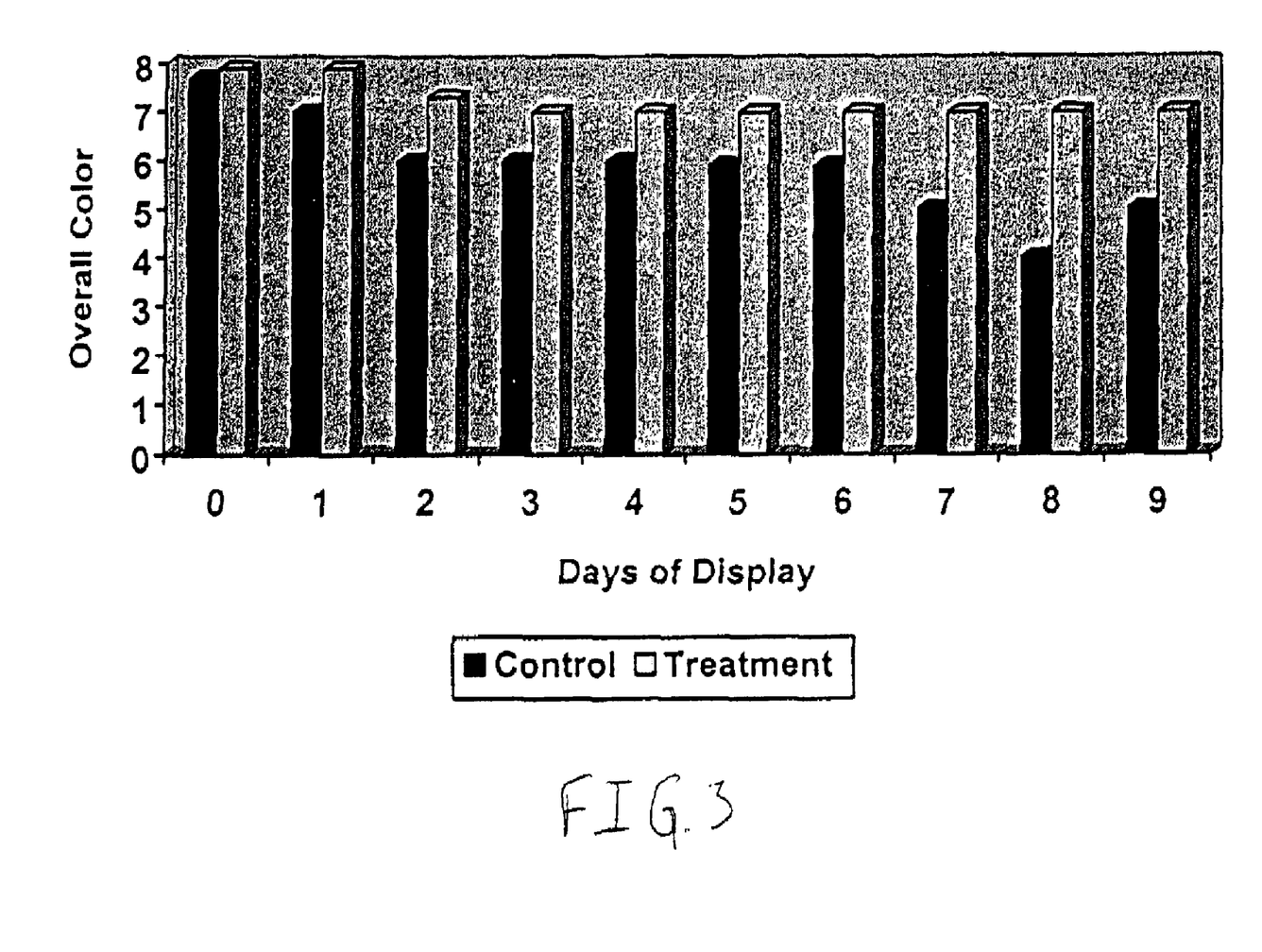
FIG. 3 depicts the overall color quality of sausage packaged in lidstock packaging after ten days of storage, according to one embodiment of the present invention.
Figure 4:
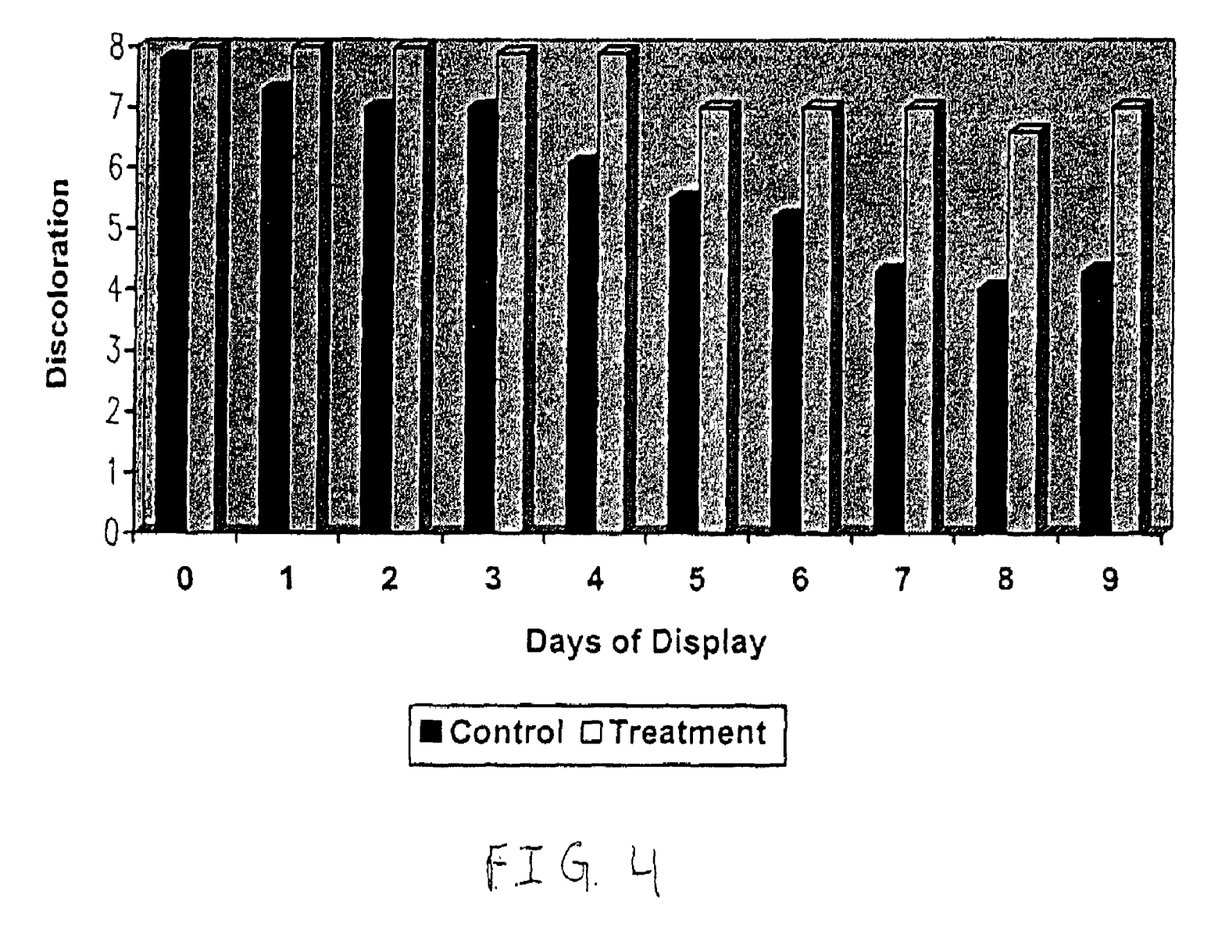
FIG. 4 depicts the color stability of sausage packaged in lidstock packaging after ten days of storage, according to one embodiment of the present invention.

The results for sausage in the lidstock packaging was the same. FIG. 3 and FIG. 4 show charts depicting the superior overall color and color stability of treated sausage during display.

The sausages in both forms of packaging were also tested for off flavors and off odors. The treated sausages had no off flavors or off odors at any point during the 10 days of storage or the 10 days of display. In contrast, the untreated sausages exhibited off flavors and off odors at around day 15.

Similarly, in the 17-day storage test, the treated sausage had a better overall color and less discoloration than the untreated sausage regardless of the type of packaging. Table 1 sets forth the overall color and discoloration scores during five days of display for sausages packaged in overwrap, and Table 2 provides the same scores for sausages packaged in lidstock.

TABLE 1

Overall Color and Discoloration
17 Days Storage in Masterbag/Overwrap and 5 Days Display

|  | Day 0 | Day 1 | Day 2 | Day 3 | Day 4 | Day 5 |
|---|---|---|---|---|---|---|
| Overall Color |  |  |  |  |  |  |
| Treatment | 8 | 8 | 7 | 7 | 6 | 5 |
| Control | 7 | 7 | 6 | 6 | 5 | 4 |
| Discoloration |  |  |  |  |  |  |
| Treatment | 8 | 8 | 7 | 7 | 6 | 5 |
| Control | 7 | 7 | 6 | 6 | 5 | 4 |

TABLE 2

Overall Color and Discoloration
17 Days Storage in Lidstock and 5 Days Display

|  | Day 0 | Day 1 | Day 2 | Day 3 | Day 4 | Day 5 |
|---|---|---|---|---|---|---|
| Overall Color |  |  |  |  |  |  |
| Treatment | 8 | 8 | 8 | 8 | 7 | 6 |
| Control | 7 | 7 | 7 | 6 | 5 | 4 |
| Discoloration |  |  |  |  |  |  |
| Treatment | 8 | 8 | 8 | 8 | 7 | 6 |
| Control | 7 | 7 | 6 | 6 | 5 | 4 |

The sausages were tested for off flavors and off odors each day. The treated sausages were found to have no off flavors or off odors through day 22. In contrast, the untreated control sausages were found to have off flavors and off odors around day 20.

Also tested at day 20 in both treated sausage and untreated sausage was microbial content. For sausages packaged in overwrapped trays, both the treated and untreated sausages exhibited a microbial count of $10^7$ colony forming units/gram ("cfu/g"). For sausages packed in lidstock trays, the treated sausages had a lower microbial content than the untreated sausages. The treated sausages had a microbial count of $10^6$ cfu/g while the untreated sausages had a count of $10^7$ cfu/g.

EXAMPLE 2

Four embodiments of the composition of the present invention were compared to examine the impact of different addition times and addition methods on overall color quality, color stability and shelf life.

Composition 1 included the following components to make 20 lbs of one embodiment of the present invention:

| Wt. (lbs) | Component |
|---|---|
| 17.994 | 72% Lean Pork Picnic Shoulder |
| 0.62 | Potassium Lactate |
| 0.36 | Water |
| 0.025 | Sodium Bicarbonate |
| 1.0 | Seasoning |

For composition 1, the pork picnic shoulder was first ground in a ⅜ inch coarse grinder. Potassium lactate, water, and seasoning were blended into the ground meat, along with sodium bicarbonate dissolved in water, and then dry ice was added. The sodium bicarbonate solution was blended into the meat at 72 hours post-rigor. Subsequently, the composition was ground a second time in a 3/16 inch fine grinder. After the second grinding step, the meat was stuffed into natural casing to form the typical sausage shape and packaged in overwrap packaging.

Composition 2 included the following components to make 20 lbs of treated sausage:

| Wt. (lbs) | Component |
|---|---|
| 18.62 | 72% Lean Pork Picnic Shoulder |
| 0.2474 | Potassium Lactate |
| 0.1226 | Water |
| 0.0010 | Sodium Bicarbonate |
| 1.0 | Seasoning |

For composition 2, the a sodium bicarbonate solution was made from the potassium lactate, water, and sodium bicarbonate. This solution was first injected into the pork picnic shoulder at 24 hours post-rigor. Following injection, the meat was ground in a ⅜ inch coarse grinder. Seasoning was then blended into the ground meat and dry ice was added. Subsequently, the composition was ground a second time in a 3/16 inch fine grinder. After the second grinding step, the meat was stuffed into natural casing to form the typical sausage shape and packaged in overwrap packaging.

Composition 3 included the following components to make 20 lbs of treated sausage:

| Wt. (lbs) | Component |
|---|---|
| 17.955 | 72% Lean Pork Picnic Shoulder |
| 0.62 | Potassium Lactate |
| 0.4 | Water |
| 0.025 | Sodium Bicarbonate |
| 1.0 | Seasoning |

For composition 3, the pork picnic shoulder was first ground in a ⅜ inch coarse grinder. A sodium bicarbonate solution, comprising 0.2 lbs water and 0.025 lbs sodium bicarbonate, was then applied to the surface of the ground meat at 24 hours post-rigor, and water was blended into the meat. Subsequently, potassium lactate and seasoning were blended into the ground meat, and then dry ice was added. The composition was then ground a second time in a 3/16 inch fine grinder. After the second grinding step, the meat was stuffed into natural casing to form the typical sausage shape and packaged in overwrap packaging.

Composition 4 included the following components to make 20 lbs of treated sausage:

| Wt. (lbs) | Component |
|---|---|
| 17.995 | 72% Lean Pork Picnic Shoulder |
| 0.62 | Potassium Lactate |
| 0.36 | Water |
| 0.025 | Sodium Bicarbonate |
| 1.0 | Seasoning |

For composition 4, the pork picnic shoulder was first ground in a ⅜ inch coarse grinder. A sodium bicarbonate solution, comprising 0.2 lbs water, 0.62 lbs potassium lactate, and 0.025 lbs sodium bicarbonate, was then applied to the surface of the ground meat at 24 hours post-rigor. Subsequently, seasoning was blended into the ground meat, and then dry ice was added. The composition was then ground a second time in a 3/16 inch fine grinder. After the second grinding step, the meat was stuffed into natural casing to form the typical sausage shape and packaged in overwrap packaging.

Testing

The impact of a sodium bicarbonate additive was tested in light of two different variables: period during processing for addition of sodium bicarbonate and methods of adding sodium bicarbonate. The timing of sodium bicarbonate addition was tested by varying the amount of time after the onset of rigor that the additive was placed into the meat. As described above, the sodium bicarbonate was added to composition 1 at 72 hours post-rigor and to compositions 2, 3, and 4 at 24 hours post-rigor. Several methods of adding the sodium bicarbonate were also examined. In composition 1, the sodium bicarbonate was dissolved in water and blended into the meat after the coarse grinding. In composition 2, a solution containing sodium bicarbonate, water, and potassium lactate was injected into the meat prior to the first grinding step. In composition 3, sodium bicarbonate dissolved in water was added to the surface of the meat after the coarse grinding step. In composition 4, a solution containing sodium bicarbonate, water, and potassium lactate was added to the surface of the meat after the coarse grinding step.

Results

Overall, the results revealed that the addition of sodium bicarbonate in any form at 24 hours post-rigor provides the best color quality and stability. Table 3 sets forth overall color scores for all four compositions after 10 days of storage in overwrap packaging followed by 10 days of display. Table 4 provides discoloration scores for the same time period. Both charts reveal that compositions 2, 3, and 4 had acceptable overall color and discoloration scores through display day 10 and that these scores were higher than those of composition 1.

Similar results were produced from 15 days of storage followed by 4 days of display. Table 5 and Table 6 show higher scores for compositions 2, 3, and 4 for overall color and discoloration.

TABLE 5

Overall Color
15 Days Storage in Masterbag/Overwrap and 4 Days Display

| Composition | Day 0 | Day 1 | Day 2 | Day 3 | Day 4 |
|---|---|---|---|---|---|
| 1 | 7 | 6 | 5 | 5 | 5 |
| 2 | 7 | 7 | 6 | 6 | 6 |
| 3 | 7 | 7 | 6 | 6 | 6 |
| 4 | 7 | 7 | 6 | 6 | 6 |

TABLE 6

Total Discoloration
15 Days Storage in Masterbag/Overwrap and 4 Days Display

| Composition | Day 0 | Day 1 | Day 2 | Day 3 | Day 4 |
|---|---|---|---|---|---|
| 1 | 7 | 6 | 5 | 5 | 5 |
| 2 | 7 | 7 | 6 | 6 | 6 |
| 3 | 7 | 7 | 6 | 6 | 6 |
| 4 | 7 | 7 | 6 | 6 | 6 |

At day 20, all four compositions were tested for off flavors and found to have none. Also tested at day 20 in all four sausages was microbial content. The microbial count was $10^6$ cfu/g for all four compositions at day 20 with no signs of spoilage.

TABLE 3

Overall Color
10 Days Storage in Masterbag/Overwrap and 10 Days Display

| Comp'n | Day 0 | Day 1 | Day 2 | Day 3 | Day 4 | Day 5 | Day 6 | Day 7 | Day 8 | Day 9 | Day 10 |
|---|---|---|---|---|---|---|---|---|---|---|---|
| 1 | 7 | 7 | 7 | 7 | 7 | 6 | 6 | 6 | 5 | 5 | 4 |
| 2 | 8 | 8 | 8 | 8 | 8 | 7 | 7 | 7 | 6 | 6 | 5 |
| 3 | 8 | 8 | 8 | 8 | 8 | 7 | 7 | 7 | 6 | 6 | 5 |
| 4 | 8 | 8 | 8 | 8 | 8 | 7 | 7 | 7 | 6 | 6 | 5 |

TABLE 4

Total Discoloration
10 Days Storage in Masterbag/Overwrap and 10 Days Display

| Comp'n | Day 0 | Day 1 | Day 2 | Day 3 | Day 4 | Day 5 | Day 6 | Day 7 | Day 8 | Day 9 | Day 10 |
|---|---|---|---|---|---|---|---|---|---|---|---|
| 1 | 7 | 7 | 7 | 7 | 7 | 6 | 6 | 6 | 5 | 5 | 5 |
| 2 | 8 | 8 | 8 | 8 | 8 | 7 | 7 | 7 | 6 | 6 | 5 |
| 3 | 8 | 8 | 8 | 8 | 8 | 7 | 7 | 7 | 6 | 6 | 5 |
| 4 | 8 | 8 | 8 | 8 | 8 | 7 | 7 | 7 | 6 | 6 | 5 |

We claim:

1. A method of making a processed meat composition comprising:
   providing fresh post-rigor meat;
   adding bicarbonate to said meat, at least approximately twenty-four hours after the onset of rigor, in an amount from about 0.05% to about 0.5% by weight of the processed meat composition; and
   grinding the fresh post-rigor meat;
   wherein the bicarbonate enhances color preservation of the meat.

2. The method of claim 1 further comprising dissolving the bicarbonate in water prior to adding the bicarbonate to the processed meat composition.

3. The method of claim 1 further comprising dissolving the bicarbonate in a solution of water and lactate prior to adding the bicarbonate to the processed meat composition.

4. The method of claim 1 further comprising adding from about 0.001% to about 5.0% seasoning.

5. The method of claim 1 further comprising adding from about 0.001% to about 3.0% water.

6. The method of claim 1 further comprising adding from about 0.001% to about 4.0% lactate.

7. The method of claim 1 wherein grinding the fresh post-rigor meat comprises coarsely grinding the fresh post-rigor meat and finely grinding the fresh post-rigor meat.

8. The method of claim 7, comprising adding bicarbonate between coarsely grinding the fresh post-rigor meat and finely grinding the fresh post-rigor meat.

9. The method of claim 7, comprising adding bicarbonate before coarsely grinding the fresh post-rigor meat.

10. The method of claim 1, comprising packaging the ground meat in a casing to form a sausage product.

11. The method of claim 1, comprising adding bicarbonate at least about 72 hours after onset of rigor.

12. A method of making a processed meat composition comprising:
    providing fresh post-rigor meat;
    adding a solution consisting essentially of bicarbonate to said meat, at least approximately twenty-four hours after the onset of rigor' in an amount from about 0.05% to about 0.5% by weight of the processed meat composition; and
    grinding the fresh post-rigor meat;
    wherein the bicarbonate enhances color preservation of the meat.

13. A method of processing meat, the method comprising the steps of:
    providing a batch of meat wherein at least a portion of said batch comprises meat that is at least twenty-four hours post-rigor;
    enhancing color preservation of said batch by adding bicarbonate to said batch in an amount from about 0.05% to about 0.5% by weight of said batch; and
    grinding said batch.

14. The method of claim 13, wherein said batch comprises a sausage product.

15. The method of claim 13, wherein said batch comprises pork.

16. The method of claim 13, wherein said batch consists essentially of pork.

* * * * *

UNITED STATES PATENT AND TRADEMARK OFFICE
CERTIFICATE OF CORRECTION

PATENT NO. : 7,378,119 B2 Page 1 of 1
APPLICATION NO. : 10/232847
DATED : May 27, 2008
INVENTOR(S) : Scott J. Eilert, Curtis J. Cundith and Max England It is certified that error appears in the above-identified patent and that said Letters Patent is hereby corrected as shown below:

<u>Title page (75), "INVENTORS:"</u>
  "Curtis A. Cundith" should be --Curtis J. Cundith--

Signed and Sealed this

Twenty-ninth Day of July, 2008

JON W. DUDAS
*Director of the United States Patent and Trademark Office*